UNITED STATES PATENT OFFICE.

FRANCIS E. GALLAGHER, OF NEWTON, MASSACHUSETTS, ASSIGNOR TO STANDARD ALCOHOL COMPANY, OF NEW YORK, N. Y., A CORPORATION OF MAINE.

PROCESS OF PRODUCING FERMENTABLE SUGARS.

1,056,161.  Specification of Letters Patent.  Patented Mar. 18, 1913.

No Drawing.   Application filed July 15, 1912.  Serial No. 709,564.

*To all whom it may concern:*

Be it known that I, FRANCIS E. GALLAGHER, a citizen of the United States, residing at Newton, in the county of Middlesex and State of Massachusetts, have invented certain new and useful Improvements in Processes of Producing Fermentable Sugars, of which the following is a specification.

This invention is a process of treating ligno-cellulose or other cellulose raw material for the production of fermentable sugars.

It is well known that certain constituents of such cellulosic raw materials as sawdust, wood-waste, etc., are convertible, in presence of dilute acids or equivalent hydrolyzing agents, into fermentable sugars; and that the proportion of such sugars formed is dependent upon certain factors, among which may be mentioned the character and concentration of the hydrolyzing agent, and the time and temperature of the cooking or digestion. I have demonstrated by numerous experiments that the reaction whereby such fermentable sugars are formed is in fact highly complex in character; and that the fermentable sugars are to be regarded as representing an intermediate stage rather than the final stage of the conversion of ligno-cellulose under the influence of hydrolyzing agents. In cooking the material at high temperatures, as for instance in treating it with dilute acids under high pressure of steam, I have found that in the early stages of the cook, there are formed relatively large percentages of soluble substances which comprise a low percentage of fermentable sugars but a relatively high percentage of so-called wood-dextrins. These wood-dextrins are not directly fermentable, but are susceptible of conversion by further hydrolysis into dextrose or similar fermentable sugars. In the later stages of the cook, the dextrose (fermentable sugar) is formed from the wood-dextrin faster than the latter is produced from the cellulose or ligno-cellulose. As the cook is further prolonged, the total quantity of fermentable sugar no longer increases, and may even decrease, due presumably to the decomposition of the sugar under the hydrolyzing influence at a rate approximating or even exceeding the rate of its formation. It is found however that after the wood-dextrins have been once formed at high temperatures, their conversion into dextrose or equivalent fermentable sugars proceeds satisfactorily at comparatively low temperatures, that is to say under a pressure of steam materially lower than that used for the preliminary cooking, or even at or below the atmospheric boiling-point of the solution. It is also found that at such lower temperatures there is materially less liability to the destruction of the fermentable sugars which have been previously formed.

In view of the foregoing considerations, I have found it advantageous, from the standpoint of final alcohol yield, to treat the wood in presence of suitable hydrolyzing agents for a short period of time under relatively high pressure and temperature, and thereafter to continue the hydrolysis of the resulting wood-dextrins at a lower temperature, thus taking advantage of the relative rates of formation of wood-dextrins and dextrose, and of the rate of decomposition of dextrose at different temperatures.

A specific example illustrating the advantage of this procedure is as follows:

1. Sawdust was cooked for fifteen minutes, in presence of one per cent. of sulfuric acid as a hydrolyzing agent, under a steam pressure of 135 pounds per square inch. The composition of the extract prepared from the cooked material was as follows, all percentages being calculated to the dry material of the sawdust:

Total solids ---------------- 23.1 per cent.
 "   reducing sugars ------ 19.3  "   "
 "   fermentable sugars --- 10.21 "   "
Ratio of fermentable solids
   to total solids ---------- 44.2
Alcohol yield --------------- 5.18 per cent.

2. Sawdust was cooked for fifteen minutes under the above conditions, followed by a supplemental digestion for thirty minutes under a steam pressure of 70 pounds. The composition of the extract was:—

Total solids ---------------- 23.6 per cent.
 "   reducing sugars ------ 19.2  "   "
 "   fermentable sugars --- 12.34 "   "
Ratio of fermentable sugars
   to total solids ---------- 52.3
Alcohol yield --------------- 6.18 per cent.

It will be observed that the principal effect of the supplemental or lower temperature cook has been to increase the percentage of fermentable sugars and hence of alcohol; and that the increase in the yield of alcohol attributable to this lower-temperature cook is in excess of 19 per cent. While the results obtained may vary somewhat widely according to the particular operating conditions selected, the effect as above noted is characteristic of my invention.

The principle of operation, involving a cook of relatively brief duration under high temperature and in presence of steam, followed by a cook at lower temperature and usually more prolonged, may be applied in many other ways, a few of which will be mentioned:

1. The preliminary cook may be carried out in the closed digester, and the supplemental cook may follow the extraction and may be carried out in any suitable vessels at, below or above the atmospheric boiling-point.

2. After the initial cook in the closed digester, the hot mass may be stored in bulk for a few hours or days, before its soluble constituents are extracted. Under such conditions, its heat is conserved and the formation of fermentable sugars continues.

3. The soluble matters contained in the cooked mass from the preliminary digestion may be extracted, and the extract submitted to the usual fermentation and distillation for recovery of alcohol. The residue from the distillation, known as "slop," contains the wood-dextrins and other bodies not susceptible of fermentation, and this slop may be subjected to further hydrolysis, either by itself or after admixture with sawdust which has undergone its preliminary or high-temperature cook. For example, the slop may be returned to the digester before or during the supplemental or lower-temperature cook, or it may be added to the extract from the digested material and further boiled or heated in closed or open vessels, to secure further hydrolytic action; or the slop may be added to the material undergoing extraction in the diffusion battery, or to the extract therefrom; or it may be otherwise subjected to heat to continue the hydrolysis. In general, any procedure may be adopted whereby those materials which have been rendered soluble by the preliminary digestion but have not yet attained the fermentable state may be subjected to heat under conditions to complete their conversion to such state. As above pointed out, the further treatment of these materials may take place in the digester, or after the charge has left the digester, or after the soluble matters have been extracted by diffusion, or even after the steps of fermentation and distillation. In the last-mentioned case, it has been found essential to the best results to add a further quantity of hydrolyzing acid, sufficient to provide an amount of free acid adequate for the hydrolysis of the wood-dextrins.

I claim:

1. A process of producing fermentable sugars from ligno-cellulose or other cellulosic raw material, which consists in digesting the material in presence of a hydrolyzing agent until a considerable proportion thereof has been rendered soluble, and thereafter continuing the digestion at a lower temperature to increase the quantity of fermentable sugars.

2. A process of producing fermentable sugars from ligno-cellulose or other cellulosic raw materials, which consists in digesting the material by direct action of steam under pressure and in presence of a suitable hydrolyzing agent until a suitable proportion thereof has been rendered soluble, and thereafter continuing the digestion at a lower temperature to increase the quantity of fermentable sugars.

3. A process of producing fermentable sugars from ligno-cellulose or other cellulosic raw materials, which consists in digesting the material by direct action of steam under pressure and in presence of a suitable hydrolyzing agent until a suitable proportion thereof has been rendered soluble, and thereafter continuing the digestion at a lower temperature and for a longer period to increase the quantity of fermentable sugars.

In testimony whereof I affix my signature in presence of two witnesses.

FRANCIS E. GALLAGHER.

Witnesses:
ARTHUR D. LITTLE,
HARRY S. MORK.